(12) United States Patent
Powell et al.

(10) Patent No.: US 12,247,514 B2
(45) Date of Patent: Mar. 11, 2025

(54) MULTI-FUEL ENGINES AND RELATED METHODS

(71) Applicant: Enginuity Power Systems, Inc., Alexandria, VA (US)

(72) Inventors: Gregory Powell, Rockville, MD (US); James C. Warren, Alexandria, VA (US)

(73) Assignee: Enginuity Power Systems, Inc., Alexandria, VA (US)

( * ) Notice: Subject to any disclaimer, the term of this patent is extended or adjusted under 35 U.S.C. 154(b) by 0 days.

(21) Appl. No.: 18/141,378

(22) Filed: Apr. 29, 2023

(65) Prior Publication Data

US 2023/0349319 A1 Nov. 2, 2023

Related U.S. Application Data

(60) Provisional application No. 63/337,278, filed on May 2, 2022.

(51) Int. Cl.
| | |
|---|---|
| *F02B 75/28* | (2006.01) |
| *F02B 43/10* | (2006.01) |
| *F02F 7/00* | (2006.01) |

(52) U.S. Cl.
CPC ............ *F02B 75/282* (2013.01); *F02B 43/10* (2013.01); *F02F 7/0002* (2013.01); *F02F 7/0021* (2013.01)

(58) Field of Classification Search
CPC ........ F02B 75/28; F02B 75/282; F02B 43/10; F02F 7/0002; F02F 7/0021
See application file for complete search history.

(56) References Cited

U.S. PATENT DOCUMENTS

| | | | |
|---|---|---|---|
| 2,134,811 A | 11/1938 | Church | |
| 2,352,396 A * | 6/1944 | Maltby | F01B 3/0079 74/56 |
| 2,357,031 A * | 8/1944 | Stabler | F01B 7/12 123/48 B |
| 2,423,395 A | 7/1947 | Lieberherr | |
| 2,853,983 A * | 9/1958 | Sawle, Jr. | F01B 7/14 123/41.16 |
| 3,417,628 A * | 12/1968 | Paul, Jr. | F16H 21/36 74/48 |
| 4,921,734 A | 5/1990 | Thorpe et al. | |
| 6,812,585 B2 | 11/2004 | Renner | |
| 9,249,693 B2 | 2/2016 | Warren et al. | |

(Continued)

FOREIGN PATENT DOCUMENTS

JP 861153 A2 3/1996

OTHER PUBLICATIONS

Gregorio, Jorge P., et al., "Development of a 4 Stroke Spark Ignition Opposed Piston Engine", Published by De Gruyter, Open Eng. 2018; 8:337-343, pp. 337-343.

(Continued)

*Primary Examiner* — Grant Moubry
(74) *Attorney, Agent, or Firm* — Capitol Patent + trademark Law Firm, PLLC

(57) ABSTRACT

Engines operating using multiple, different types of fuel are described. The engines may include components that control the introduction of fuels and/or reduce premature pre-ignition of fuels, such as a fuel comprising a percentage of hydrogen. The described hydrogen-fueled engines have a reduced carbon footprint.

5 Claims, 15 Drawing Sheets

(56) References Cited

U.S. PATENT DOCUMENTS

| | | | |
|---|---|---|---|
| 9,341,136 B2 | 5/2016 | Williams et al. | |
| 10,072,604 B2 * | 9/2018 | Mc Clearen | F02F 1/186 |
| 10,156,202 B2 | 12/2018 | Wagner et al. | |
| 11,028,694 B2 | 6/2021 | Frasinel et al. | |
| 2009/0314252 A1 * | 12/2009 | Perewusnyk | F01B 9/047 |
| | | | 123/90.11 |
| 2012/0029174 A1 | 11/2012 | Elsbett et al. | |
| 2013/0220281 A1 * | 8/2013 | Laimboeck | F02B 25/14 |
| | | | 123/51 BD |
| 2015/0027418 A1 * | 1/2015 | Bucksey | F02B 5/00 |
| | | | 123/51 R |
| 2021/0054781 A1 | 2/2021 | Nishida et al. | |

OTHER PUBLICATIONS

PCT Search Report, Sep. 20, 2023, entire document.

\* cited by examiner

VIEW A-A

MULTI-FUEL ENGINES AND RELATED METHODS

RELATED APPLICATIONS

This application claims priority to U.S. Provisional Application No. 63/337,278 filed May 2, 2022 ('278 Provisional Application). This application also incorporates by reference the entire disclosures set forth in the '278 Provisional Application, U.S. Non-Provisional application Ser. No. 17/696,834 filed Mar. 16, 2022, U.S. Non-Provisional application Ser. No. 17/151,253 filed Jan. 18, 2021, and U.S. Non-Provisional application Ser. No. 16/875,963, filed May 15, 2020. This application also incorporates by reference the entire disclosures set forth in the following issued patents: U.S. Pat. Nos. 7,004,120, 7,448,352, 8,113,164, 9,708 910, 9,708,976 and 9,869,244. Collectively, the '278 Provisional Application, three Non-Provisional Applications and six issued US patents may be referred to herein as "Related Applications" for short.

TECHNICAL FIELD

This disclosure relates to the field of inwardly opposed piston engines (OPEs) and their many applications, including, but not limited to, OPEs that are capable of using a variety of different fuels such as hydrogen or biogases (i.e., "multi-fuels") to reduce the carbon "footprint" of an OPE when compared to existing OPEs.

INTRODUCTION

This section introduces aspects that may help facilitate a better understanding of the inventions. Accordingly, the statements of this section are to be read in this light and are not to be understood as admissions about what is, or what is not, prior art.

To date, it has been a significant challenge to produce OPEs that provide sufficient power for a range of applications, yet are quiet, small in size and reliable, particularly OPEs that may use hydrogen as a fuel to reduce the carbon footprint of an OPE.

Accordingly, it is desirable to provide solutions to these challenges.

SUMMARY

The inventors describe various exemplary, inventive OPEs.

For example, one exemplary OPE may comprise: a first and second section, the first section comprising one or more first cylinders and the second section comprising one or more second cylinders, where each first cylinder may comprise a first piston and each second cylinder may comprise a second piston; and one or more bolts (e.g., spar bolts) configured to mate the first section to the second section such that each first cylinder and its respective piston is inwardly, opposedly aligned with one of the second cylinders and its respective piston.

Further, such an OPE may further comprise one or more spacers configured between the first and second section, where each of the one or more spacers may be composed of: (i) a ceramic; or (ii) an aluminum. In case where the spacers are composed of a ceramic, the ceramic may comprise a silicon carbide. Still further, each of the one or more spacers may be formed from a sandwich of two sheets of carbon fiber with a ceramic center. Yet further, the one or more of the one or more spacers may be composed of an engineered steel or a material having equivalent properties as a ceramic, engineered steel or aluminum, for example.

Another exemplary OPE may comprise: a fuel injection control system, where the fuel injection control system may comprise, one or more rotatable gears, and one or more direct injector, fuel control valves, where each direct injector, fuel control valve is configured to feed a hydrogen or a biogas fuel to a tubular control valve and, as desired, to at least one direct fuel injector.

In an embodiment, the tubular control valve may comprise a stationary outer tube and a solid, rotating inner tube and the one or more rotatable gears may be connected to a crankshaft and rotate at a speed that approximates ¼ of the rotational speed of the crankshaft to control the flow of the hydrogen or biogas fuel.

Further, the rotating inner tube may comprise one or more channels configured through a diameter of the rotating inner tube, where each of the channels may be positioned along the inner tube at locations that rotatably align with a pair of fixed openings at the top and bottom of the stationary outer tube as the inner tube rotates. Each of the channels may align with a pair of openings such that when a channel rotatably aligns with its corresponding pair of openings the hydrogen or biogas fuel flows through an injector body into a direct fuel injector. In embodiments, the dimensions of the channels may be determined based at least on measured or expected pressure of the hydrogen or biogas fuel.

In addition, the exemplary OPEs may further comprise one or more control switches operable to receive an electrical signal from a sensor indicating the OPE is no longer operating. In such a case, in response to reception of such an electronic signal, the one or more control switches may close to prohibit the flow of the hydrogen or biogas fuel.

This exemplary OPE may also comprise one or more spacers, where again, each of the one or more spacers may be composed of: (i) a ceramic; or (ii) an aluminum. In case where the spacers are composed of a ceramic, the ceramic may comprise a silicon carbide. Still further, each of the one or more spacers may be formed from a sandwich of two sheets of carbon fiber with a ceramic center. Yet further, the one or more of the one or more spacers may be composed of an engineered steel or a material having equivalent properties as a ceramic, engineered steel or aluminum, for example.

Yet further, the OPEs may be configured to use one or more different fuels, where the fuel may comprise (i) a fuel that comprises a percentage of hydrogen, (ii) a fuel that comprises up to 20% hydrogen; (iii) a fuel that comprises from 20% to below 100% hydrogen; (iv) a fuel that comprises pure hydrogen (close to 100% hydrogen) or (v) a biogas, to name few of the many fuels that may be used with an inventive OPE.

BRIEF DESCRIPTION OF THE DRAWINGS

The present invention is illustrated by way of example and is not limited by the accompanying figures in which like reference numerals indicate similar elements and in which.

Figure 1:
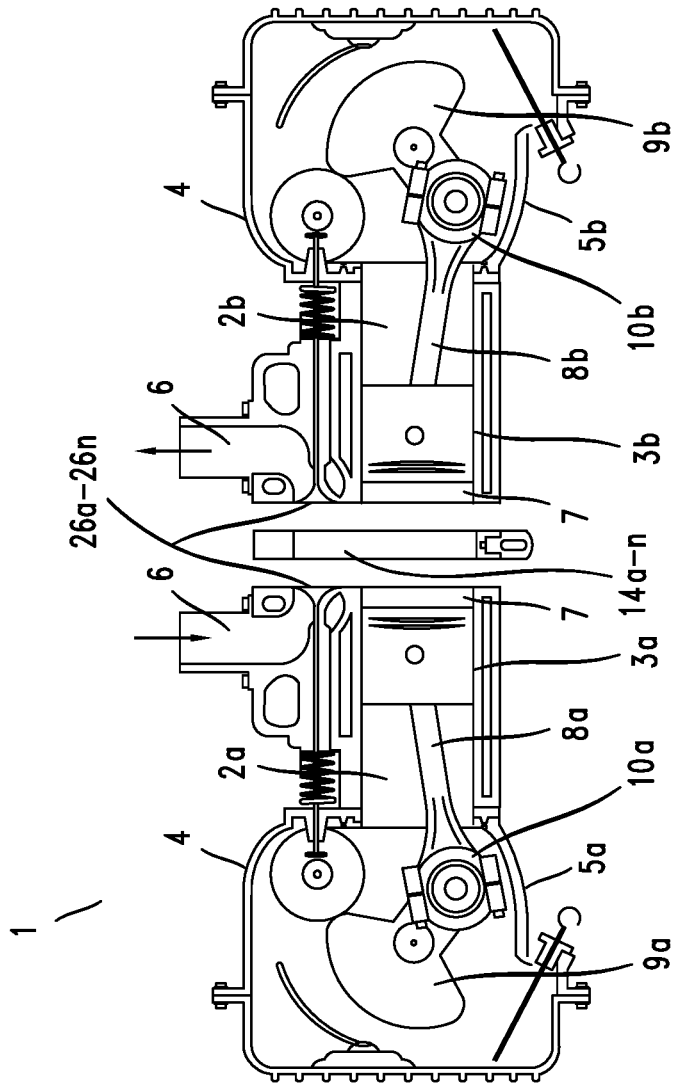
FIG. 1 depicts an illustration of a cylinder of an exemplary OPE that may use a percentage of hydrogen as fuel according to the disclosure.

Specific embodiments of the present invention are disclosed below with reference to various figures and sketches. Both the description and the illustrations have been drafted with the intent to enhance understanding. For example, the dimensions of some of the elements in the figures may be exaggerated relative to other elements, and well-known elements that are beneficial or even necessary to a commercially successful implementation may not be depicted so that a less obstructed and a clearer presentation of embodiments may be achieved.

Simplicity and clarity in both illustration and description are sought to effectively enable a person skilled in the art to make, use, and best practice the present invention in view of what is already known in the art. One skilled in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EXEMPLARY EMBODIMENTS

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

As used herein and in the appended claims, the term "comprises," "comprising," or variations thereof are intended to refer to a non-exclusive inclusion, such that a process, method, article of manufacture, or apparatus (e.g., an OPE) that comprises a list of elements includes those elements in the list and may include other elements not expressly listed or inherent to such process, method, article of manufacture, or apparatus.

The terms "a" or "an", as used herein, are defined as one, or more than one. The term "plurality", as used herein, is defined as two, or more than two. The term "another", as used herein, is defined as at least a second or more.

Unless otherwise indicated herein, the use of relational terms, if any, such as "first" and "second", "top" and "bottom" and the like are used solely to distinguish one view, entity or action from another view, entity or action without necessarily requiring or implying any actual such relationship, order or importance between such views, entities or actions.

The terms "including" and/or "having", as used herein, are defined as comprising (i.e., open language).

The terms "exemplary" and/or "embodiment" mean one example of an inventive device (e.g., an OPE), process or component/step in a disclosed device or process.

Similar reference characters denote similar features consistently throughout the attached drawings.

Referring now to FIG. 1, there is depicted a simplified, cross-sectional illustration of an inventive OPE 1 according to one embodiment of the present invention.

The OPE 1 may comprise a four-cycle or four-stroke engine configured to operate using a spark-ignited homogenous charge, spark-ignited direct injection, or compression ignition. That said, in an embodiment, when the disclosed, inventive OPEs described herein operate using a percentage of hydrogen as a fuel the combustion may be compression ignition to minimize the potential for unwanted, premature pre-ignition.

While some of the figures herein may show only one cylinder of an OPE for clarity, it should be understood that one or more cylinders may be utilized depending on the amount of power desired to be produced by an OPE, such as OPE 1 (e.g., four or more cylinders). In an embodiment, each cylinder comprises one or more inwardly opposed pistons, such as pistons 3a, 3b shown in FIG. 1.

The exemplary OPEs disclosed herein, including OPE 1, may include, crankshafts, connecting rods, gear trains, valves, portions of output shafts and other engine components which are operatively coupled to inwardly opposed pistons as may be described herein or, to the extent consistent, in the Related Applications.

In more detail, an engine housing 4 may function as a base onto which other portions of the OPE 1 or other devices powered by, or connected to, the OPE 1 may be mounted or secured. The exemplary housing 4 shown in FIG. 1 includes a single pair of inwardly opposed pistons 3a, 3b and associated engine components which are operatively coupled to the pistons. However, the engine housing 4 may be configured to include more than one cylinder and, therefore, more than one pair of inwardly opposed pistons according to the requirements of a particular application, for example.

In embodiments, the OPE 1 may be formed by mating two separate engine blocks or sections 5a, 5b together. Each section 5a, 5b may be formed by casting, machining, and other similar processes, for example. For ease of discussion, section 5a may be referred to as a "first" section while section 5b may be referred to as a "second" section though these designations may be reversed. Accordingly, in an embodiment, the first section 5a may comprise one or more first cylinders 2a and the second section 5b may comprise one or more second cylinders 2b, where each first cylinder 2a may comprise a first inwardly opposed piston 3a and each second cylinder 2b may comprise a second inwardly opposed piston 3b.

In an embodiment, the housing 4 and/or its sections 5a, 5b may be formed from steel, aluminum, or any other suitable material or materials.

Figure 6:
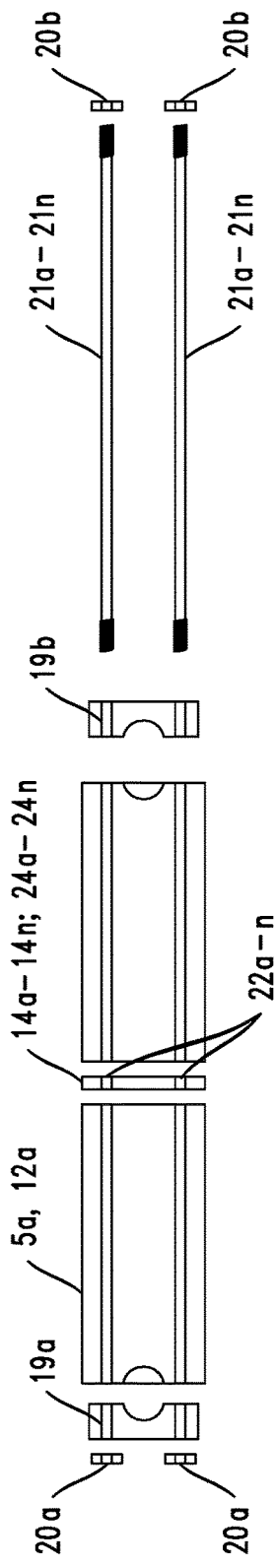
FIGS. 6 and 7 depict exemplary bolts (e.g., spar bolts) and spacers that may be used with exemplary OPEs that may use a percentage of hydrogen as a fuel according to the disclosure.

The two sections 5a, 5b and one or more spacers 14a to 14n (where "n" indicates a last spacer) configured between the sections 5a, 5b may be mated together and held by one or more (typically more) lengthwise connectors, such as bolts (e.g., spar bolts; see elements 21a to 21n in FIG. 6). Said another way, in an embodiment, one or more bolts may be configured to mate the first section 5a to the second section 5b (and any spacers 14a to 14n therebetween the sections 5a, 5b) such that each first cylinder 2a and its respective piston 3a are inwardly, opposedly aligned with one of the second cylinders 2b and its respective piston 3b. The bolts may be configured to have a length that accommodates the overall size of the two sections 5a, 5b to meet a range of desired engine configurations.

When mated or connected together each first cylinder 2a that is aligned with a second cylinder 2b forms one combined cylinder.

Further, the OPE 1 may include suitable gaskets or seals positioned along any seams between joined sections 5a, 5b of the OPE 1 and around exemplary valve assemblies 26a to 26n (e.g., 2 to 4 valve assemblies; only two are shown for clarity's sake,) to prevent the escape of lubricating oil and gases, such as hydrogen.

The housing 4 may be secured to a frame or to another portion of a larger device (e.g., hot water tank, electric generator, and/or vehicle) or to other engine components (e.g., catalytic converter, muffler), for example, using bolts, welds, or any other suitable mechanism.

Because the size of the OPE 1 can be varied the desired number of cylinders can also be varied to meet specific power requirements, for example.

The respective, inwardly opposed pistons 3a, 3b may be connected to respective crankshafts 10a, 10b (ends of crankshafts shown) by respective connecting rods 8a, 8b, for example, within the respective cylinders 2a, 2b. When sections 5a, 5b are mated or connected together, pistons 3a, 3b may be configured to move within respective cylinders 2a, 2b in order to move and rotate the crankshafts 10a, 10b via rods 8a, 8b. Each associated crankshaft 10a, 10b and/or connecting rod 8a, 8b may be configured to aid in providing a predetermined stroke length to its associated piston 3a, 3b, respectively, residing within the respective cylinders 2a, 2b.

Continuing, the inwardly opposed first and second pistons 3a, 3b may have predetermined lengths and predetermined diameters. In one embodiment, the stroke length of each piston 3a, 3b may be twice the amount of a conventional engine, for example. Thus, the total difference between the spacing of the pistons at closest approach to each other (i.e., at "top dead center") and the maximum spacing of the pistons during the engine cycle (i.e., at "bottom dead center") may also be twice the amount of a conventional engine, for example.

The piston lengths may be geometrically determined in accordance with the piston stroke length and the lengths of valve apertures formed in a wall of a cylinder through which flow exhaust gases and air for combustion.

As shown in FIG. 1, the respective cylinders 2a, 2b of the OPE 1 may be configured to form a pre-chamber 6 for combustion and a main chamber 7 for combustion when the sections 5a, 5b and spacers 14a to 14n are mated or connected together. In embodiments the OPE 1 (as well as other OPEs disclosed herein) may be configured to provide combustion via compression, spark-ignition or some combination of compression and spark-ignition combustion. However, as noted previously, when the disclosed, inventive OPEs described herein operate using a percentage of hydrogen, the combustion may be via compression ignition to minimize the potential for unwanted, premature pre-ignition. Though spark plugs, glow plugs and injectors are not shown in FIG. 1 it should be understood that one or more spark plugs, glow plugs and/or injectors may be included in the inventive OPEs described herein, either in a pre-chamber, main chamber or in both chambers, for example.

In an embodiment, OPEs disclosed herein may be configured in an L head configuration.

As indicated herein, some embodiments of inventive OPEs may utilize hydrogen as a fuel. Accordingly, the inventors recognize that hydrogen fueled OPEs may include additional features as compared to gasoline or diesel fueled OPEs.

For example, in one embodiment an inventive OPE may include a specialized fuel storage tank composed of a reinforced material to ensure that hydrogen does not leak if, for example, the tank is struck by an object or undergoes a sudden change in pressure. Depending on the desired pressure required to store the hydrogen fuel, the tank material may comprise one or more of the following exemplary materials: an aluminum, an engineered steel, an aluminum that includes a composite material (e.g., glass fiber/aramid or carbon fiber), a composite material, and/or a composite material with a thermoplastic liner.

Relatedly, the same type of materials may be used to construct (i) fuel lines that connect the storage tank and other components of an OPE, (ii) engine intake components (e.g., injectors), and (iii) intake and exhaust valves and valve seats to ensure that hydrogen does not leak.

Other components of a hydrogen fueled OPE may need to be constructed using some of the same materials as just described. For example, connecting rods, piston rings, and cam and crank bearings may need to be made from materials that function as controls to reduce undesirable temperatures and frictional surfaces in the presence of hydrogen.

Further, to ensure that direct fuel injectors used in a hydrogen fueled OPE are durable and reliable such injectors may include one or more internal coatings that reduce the coefficient of friction and/or corrosion as the injector is operated and hydrogen flows through. For example, exemplary coatings made from a diamond-like carbon and/or a well-adhered nanolaminate mixture may be used.

Still further, the inventors also recognize that utilizing hydrogen as a fuel for an OPE most likely requires changes to the emission section (e.g., muffler, catalytic converters) of a hydrogen fueled OPE compared to non-hydrogen fueled OPEs. For example, combustion of hydrogen produces oxides of nitrogen (e.g., NOx) which must be filtered, treated or removed by an emission treatment module of an OPE to meet federal and state emissions standards and regulations.

Figure 2:
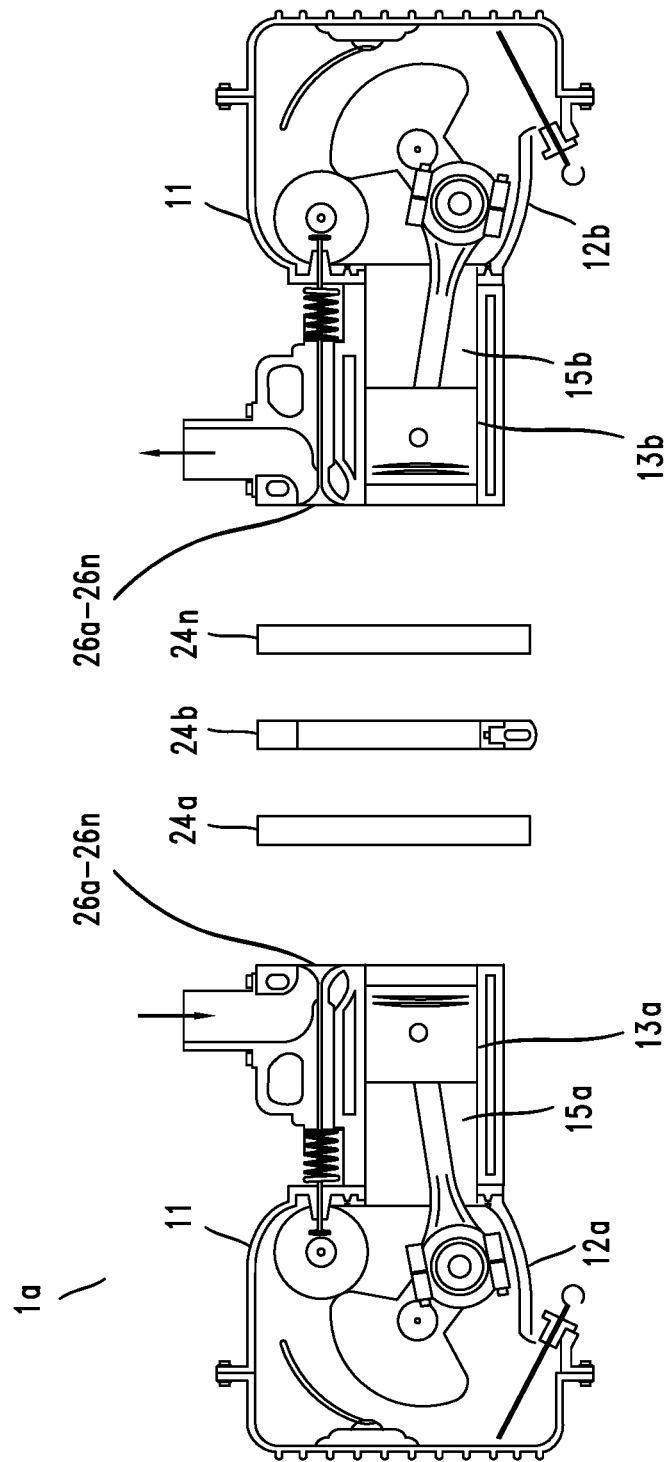
FIG. 2 depicts another exemplary OPE that may use a percentage of hydrogen as fuel according to the disclosure.

Referring now to FIG. 2 there is depicted another embodiment of an exemplary OPE 1a, such as a biogas fueled OPE. Similar to before, the OPE 1a may comprise a four-cycle or four-stroke engine utilizing a variety of methods for fuel conversion, comprising one or more cylinders. Further, the OPE 1*a* may be formed by mating two separate engine blocks or sections 12*a*, 12*b* together. Each section 12*a*, 12*b* may be formed by casting, machining, and other similar processes, for example. For ease of discussion, section 12*a* may be referred to as a "first" section while section 12*b* may be referred to as a "second" section though these designations may be reversed. Accordingly, in an embodiment, the first section 12*a* may comprise one or more first cylinders 15*a* and the second section 12*b* may comprise one or more second cylinders 15*b*, where each first cylinder 15*a* may comprise a first inwardly opposed piston 13*a* and each second cylinder 15*b* may comprise a second inwardly opposed piston 13*b*.

In an embodiment, the housing 11 and sections 12*a*, 12*b* may be formed from steel, aluminum, or any other suitable material or materials.

The two sections 5*a*, 5*b* and one or more spacers 24*a*, 24*b* to 24*n* (where "n" again indicates a last spacer) configured between the sections 12*a*, 12*b* may be mated together and held by one or more (typically more) lengthwise connectors, such as bolts (e.g., spar bolts; see elements 21*a* to 21*n* in FIG. 6). Said another way, in an embodiment, one or more bolts may be configured to mate the first section 12*a* to the second section 12*b* (and any spacers 24*a*, 24*b* to 24*n* therebetween the sections 12*a*, 12*b*) such that each first cylinder 15*a* and its respective piston 13*a* are inwardly, opposedly aligned with one of the second cylinders 15*b* and its respective piston 13*b*. The bolts may be configured to have a length that accommodates the overall size of the two sections 12*a*, 12*b* to meet a range of desired engine configurations.

When mated or connected together each first cylinder 15*a* that is aligned with a second cylinder 15*b* forms one combined cylinder.

Though three spacers 24*a*, 24*b* to 24*n* are shown, this is merely exemplary. A greater or lesser number of spacers may be used depending on the application, type of fuel or combustion process to be used.

Further, assuming each type of spacer has the same width, the greater the number of spacers the larger the combustion chamber and lower the compression ratio. Conversely, again assuming each type of spacer has the same width, the lesser the number of spacers the smaller the combustion chamber and higher the compression ratio. Thus, in embodiments of the disclosure herein the compression ratio may be controlled by, among other things, varying the number of spacers used in an OPE, such as OPEs 1, 1*a*.

Further, the greater the width of each spacer 24*a*, 24*b* to 24*n* the larger the combustion chamber and lower the compression ratio. Thus, in embodiments of the invention the compression ratio may controlled by, among other things, varying the width and/or number of spacers used in an OPE, such as OPEs 1, 1*a*.

Figure 3:
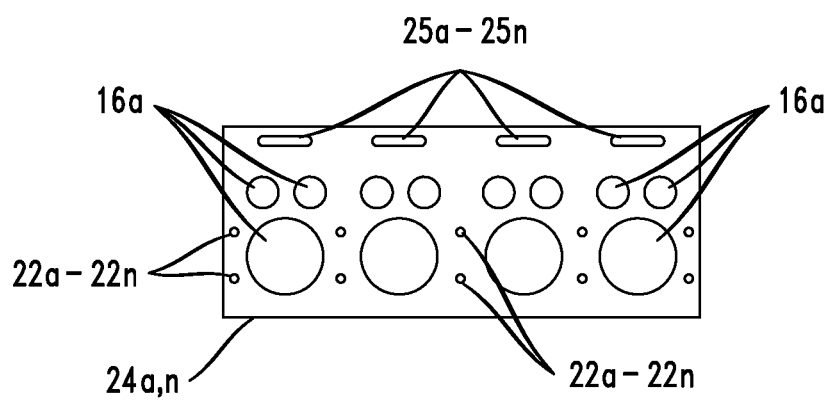
FIGS. 3 and 4 depict exemplary engine spacers that may be used with exemplary OPEs that may use a percentage of hydrogen as a fuel according to the disclosure.
Figure 4:
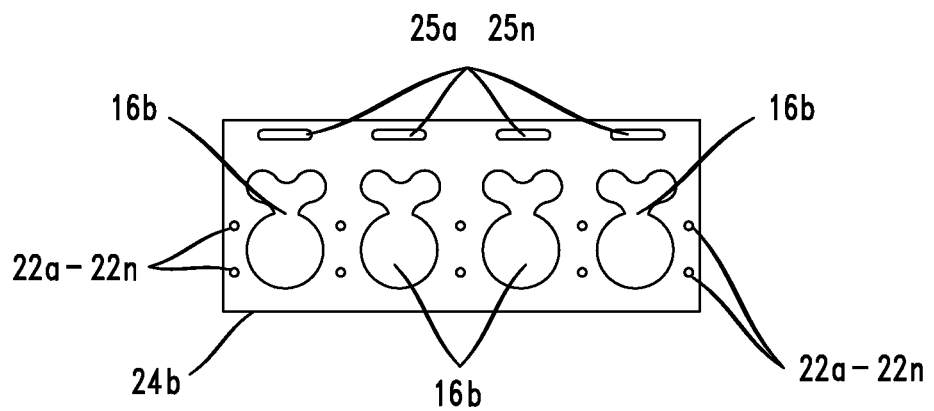

FIGS. 3 and 4 depict two exemplary types of spacers. In FIG. 3, the exemplary spacers 24*a*, 24*n* are shown while in FIG. 4 the exemplary spacer 24*b* is shown. In an embodiment, each of the spacers 24*a*, 24*b* to 24*n* may be composed of a ceramic, such as silicon carbide, for example. In more detail each spacer 24*a*, 24*b* to 24*n* may be formed from a sandwich of two sheets of carbon fiber with a ceramic center which may form a combustion chamber (e. g., see FIGS. 4 and 5). The inventors believe that when the fuel being used comprises a percentage of hydrogen, a combustion chamber configured from silicon carbide spacers is preferred over a chamber comprised of a metal alloy based spacers because the fuel containing a percentage of hydrogen may encounter fewer "hot spots" in such a combustion chamber configured from silicon carbide spacers, and thus the likelihood that the fuel may be prematurely ignited or "detonated" (hereafter ignited) may be reduced as compared to an interior combustion chamber surface configured from metal alloy spacers because of the differences in thermal properties of ceramics when compared to metal alloys, for example. The inventors believe that the reduction in premature pre-ignition, combined with improved thermal efficiency, is a technological improvement over existing OPEs, especially OPEs that may operate using a fuel that contains a percentage of hydrogen (e.g., a fuel that comprises up to 20% hydrogen, or a fuel that comprises from 20% to below 100% of hydrogen, or a fuel that comprises substantially pure hydrogen). That said, in configurations where premature pre-ignition is not a primary concern, the spacers 24*a*, 24*b* to 24*n* (and thus a combustion chamber) may be composed of a metal alloy, such as aluminum, to name just one example of a metal alloy that may be used.

In FIGS. 3 and 4, two types of exemplary, shaped combustion chambers may be formed by two types of respective openings 16*a*, 16*b* in a respective spacer 24*a*, 24*n* and 24*b* (only a few of the openings have been labeled for clarity). However, it should be understood that a spacer 24*a*, 24*b* to 24*n* may include different shaped openings than those depicted in FIGS. 3 and 4, and thus different combustion chambers may be formed provided that the combustion chamber be shaped to ignite a fuel by compression, though spark ignition or some combination of the two may also be used.

FIGS. 3 and 4 also include exemplary coolant passageways 25*a* to 25*n* that are configured (e.g., positioned and dimensioned) to allow passage of an engine coolant, such as water or glycol, for example.

Figure 5:
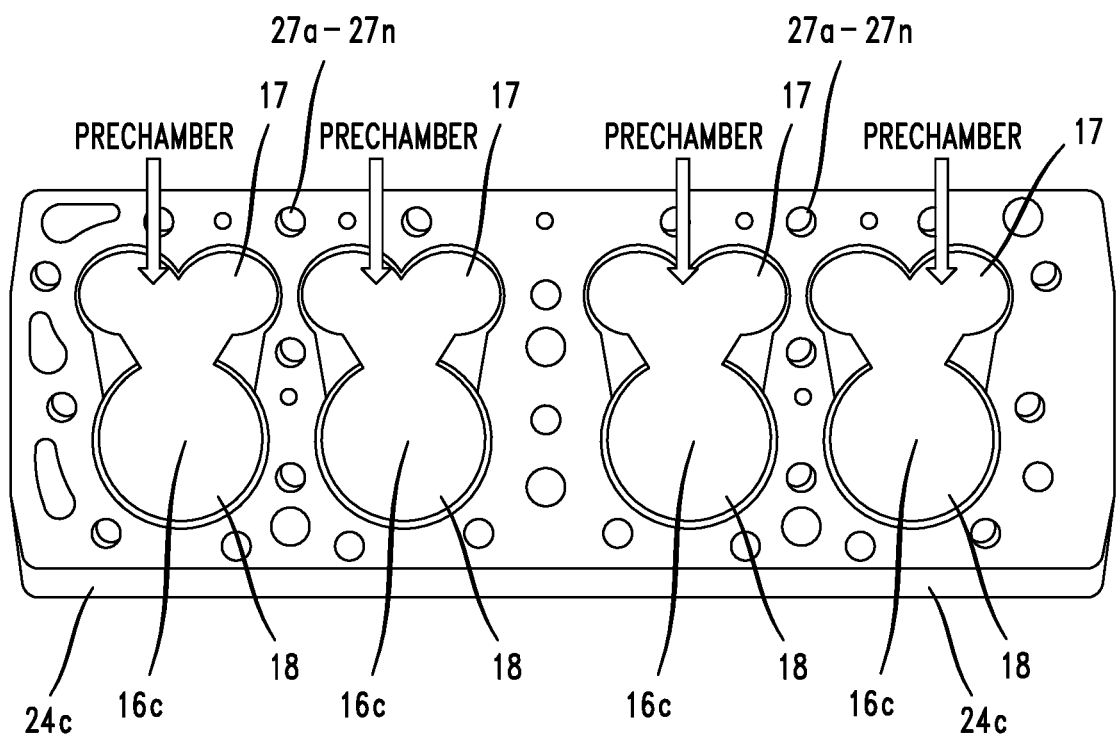
FIG. 5 depicts an exemplary engine spacer that may be used with exemplary OPEs that may use a percentage of hydrogen as a fuel according to the disclosure.

FIG. 5 depicts an enlarged view of another exemplary spacer 24*c*. In an embodiment, the spacer 24*c* may be similar to spacer 24*b* except for the configuration of the coolant passageways. Spacer 24*c* may comprise a center section formed from a single piece of aluminum, another suitable alloy or a ceramic (e.g., silicon carbide). Alternatively, the center section may comprise a number of sections.

As shown, spacer 24*c* may include one or more openings 16*c*, where each opening 16*c* (only a few are labeled) may comprise a first section 17 used to form of a portion of a pre-chamber and a second section 18 used to form of a portion of a main chamber for combustion of a fuel, such as a fuel that contains a percentage of hydrogen (e.g., up to a 20% hydrogen and the remaining content comprising a natural gas, or a hydrogen content is 20% to below 100% of the total biogas mixture or where the content of the biogas comprises a pure hydrogen) or a biogas fuel. OPEs that operate using a fuel containing a percentage of hydrogen are believed to reduce the carbon footprint of the OPE.

The inventors believe that the incorporation of pre-chambers or approximation of pre-chambers into an inventive OPE, such as OPE 1 or 1*a*, leads to more efficient combustion when compared to an engine that does not use a pre-chamber because the fuel is first ignited in an approximation of a pre-chamber before the fuel enters a main chamber. Accordingly, the inventors believe that the more efficiently the fuel mixture is ignited and burned, the larger the proportion of the fuel that an OPE 1,1*a* will convert into energy to operate the OPE 1, 1*a*. Further, because the adiabatic interface between two cylinder sections (e.g., sections 12*a*, 12*b*) will not function as heat sink because there is no cylinder head, deleterious thermal losses are minimized which leads to greater efficiencies. Still further, as mentioned elsewhere herein, when a spacer is constructed of a ceramic rather than a metal alloy the potential for premature pre-ignition is even further reduced (which leads to greater fuel efficiency).

The spacer 24c may also include additional openings or perforations 27a to 27n to allow for coolant to flow through and/or to allow bolts described herein to pass through substantially unimpeded (e.g., spar bolts). The additional openings or perforations may be of a size and type specific to a particular OPE design but may roughly conform to the exemplary shape of additional openings or perforations 27a to 27n in FIG. 5 (only some of the additional openings or perforations 27a to 27n are labeled in FIG. 5 for clarity).

Referring now to FIG. 6 there is depicted a simplified drawing of exemplary bolts 21a to 21n (e.g., spar bolts, where "a" indicates the first bolt and "n" indicates the last bolt) that may be used to connect two sections, such as sections 5a, 5b or 12a, 12b, of OPEs 1,1a together that may operate using a fuel that contains a percentage of hydrogen or a biogas fuels.

In an embodiment, each bolt 21a to 21n may be configured to longitudinally pass through openings in each of the sections 5a, 5b or 12a, 12b of each of the engines 1, 1a as well as through openings 22a to 22n in each spacer 14a to 14n, 24a, 24b, to 24n As noted previously, sections 5a, 5b and 12a, 12b may comprise separate engine blocks such that the bolts 21a to 21n pass through openings in each of the respective engine blocks 5a, 5b or 12a, 12b in order to connect the two engine blocks and respective spacers together.

In an embodiment, a single bolt 21a to 21n may be composed of an engineered steel and may have a length that extends from one crankshaft to another crankshaft of an OPE, including those that operate using a fuel that contains a percentage of hydrogen or a biogas fuel. Though fuels that contain a percentage of hydrogen or a biogas fuel are described as being used herein, it should be understood that the inventive bolts and spacers may be used with other fuels as well.

In effect, the incorporation of such bolts 21a to 21n into an OPE effectively may make the bolts 21a to 21n the superstructure of an inventive OPE. Further, the incorporation of such bolts 21a to 21n may allow a number of cylinders to be cast.

In embodiments, each bolt 21a to 21n may have a length that is determined by the dimensions of the two sections 5a,5b or 12a,12b of the OPEs 1,1a (e.g., the width or length of both sections) plus the dimensions of any engine caps 19a, 19b and spacers, such as spacers 24a, 24b, to 24n. Each bolt 21a to 21n may be secured to a respective engine block and engine cap using connectors 20a, 20b (e.g., nuts) on both opposite ends, for example.

In embodiments, the inventive bolts 21a to 21n (e.g., again spar bolts) may replace the need to have head studs holding the two sections 5a, 5b or 12a, 12b of the OPEs 1, 1a together. Further, to incorporate the bolts 21a to 21n, the end caps 19a, 19b of crankshafts may be slightly machined in order for example, to accommodate a higher degree of torque similar to what is commonly employed on conventional cylinder heads (e.g., around ~90 lb. ft. of torque).

Figure 7:
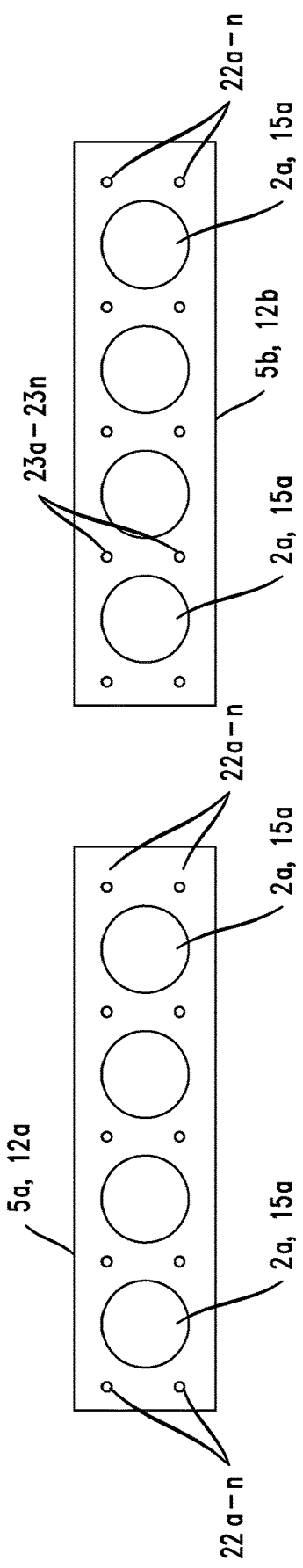

FIG. 7 depicts another simplified diagram of the openings 22a to 22n (only some are labeled for clarity) that may be made in engine blocks 5a, 5b or 12a, 12b. In embodiments, the dimensions of the openings 22a to 22n may be configured to receive the one or more bolts 21a to 21n, or vice versa (the dimensions of the spar bolts 21a to 21n may be configured to fit into the one or more openings 22a to 22n).

Figure 8A:
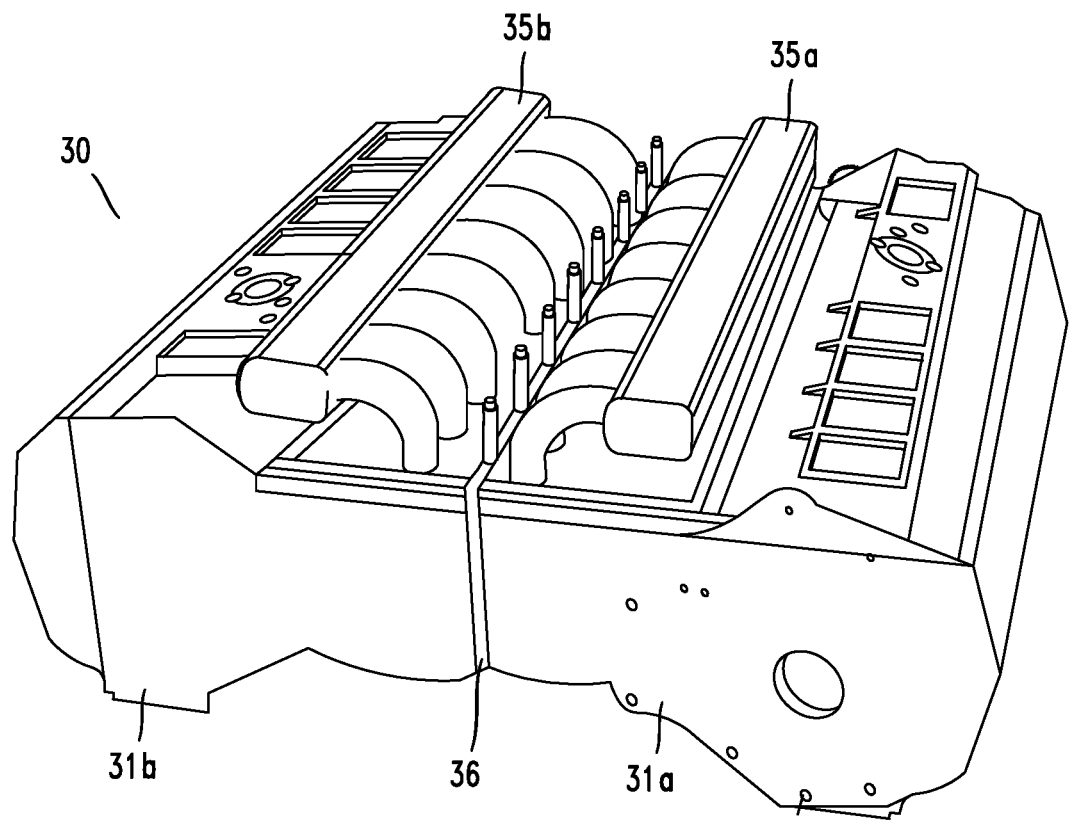
FIGS. 8A and 8B depict back and front views of an exemplary OPE, such as a biogas fueled OPE, provided by the present disclosure.
Figure 8B:
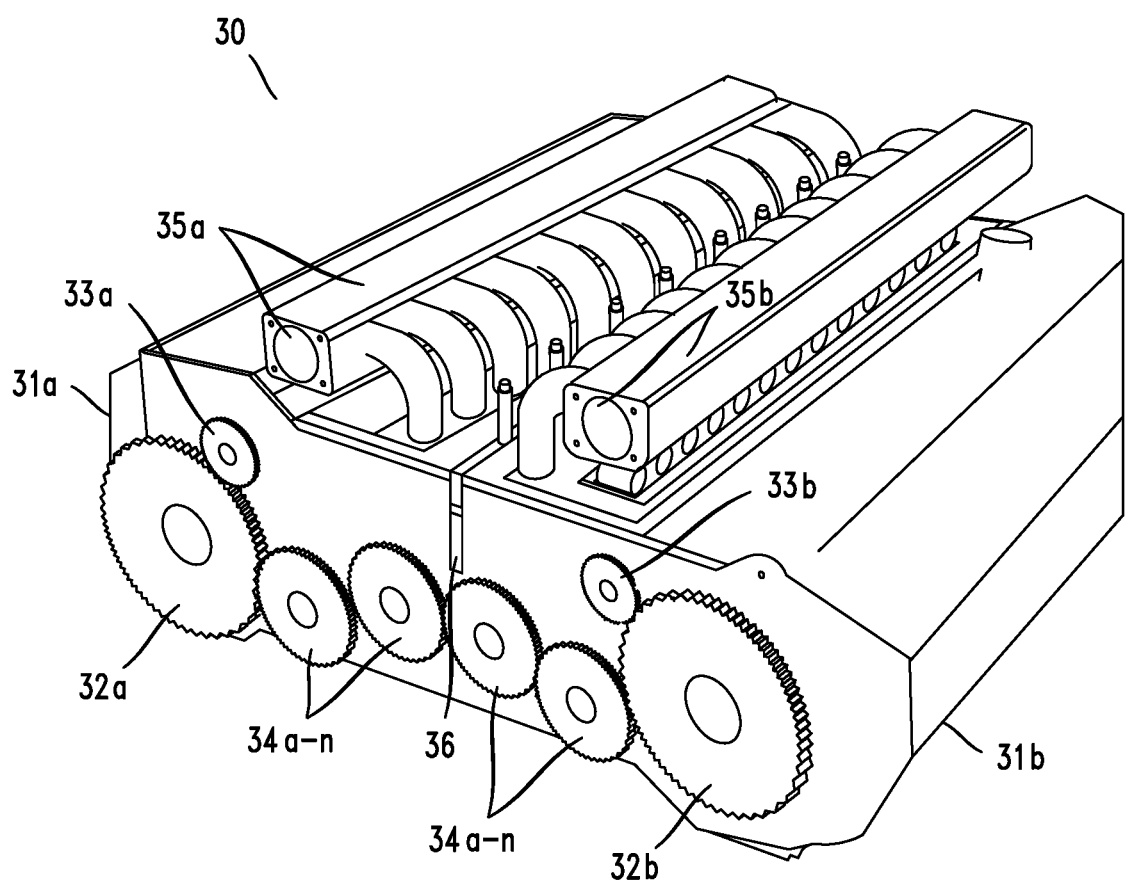

FIGS. 8A and 8B depict back and front views of an exemplary OPE 30, such as a biogas fueled OPE or an OPE that uses a fuel containing a percentage of hydrogen. Though fuels that contain a percentage of hydrogen or a biogas fuel are described as being used herein, it should be understood that the inventive OPE 30 and its components may be configured, composed or structured to use other fuels as well. In more detail, the engine 30 may be configured as a spark ignition (SI), compression (CI), SA-CI, partially-premixed combustion compression ignition (PPCI) or direct-injection compression-ignition (GCI) engine. That said, in an embodiment, when the disclosed, inventive OPE 30 operates using a percentage of hydrogen as a fuel the combustion may be compression ignition to minimize the potential for unwanted, premature pre-ignition.

The OPE 30 may comprise a four-cycle or four-stroke engine utilizing a variety of methods for fuel conversion. In embodiments, the OPE 30 may be formed by mating two separate engine blocks or sections 31a, 31b along with one or more spacers 36 using one or more (typically more) differently sized bolts 37a to 37n, 38a to 38n together (e.g., spar bolts; bolts not shown but see FIGS. 9a through 11). Each section 31a, 31b may be formed by casting, machining, and other similar processes, for example. As before, for ease of discussion, section 31a may be referred to as a "first" section while section 31b may be referred to as a "second" section though these designations may be reversed. Accordingly, in an embodiment, the first section 31a may comprise one or more first cylinders and the second section 31b may comprise one or more second cylinders, where each first cylinder may comprise a first inwardly opposed piston and each second cylinder may comprise a second inwardly opposed piston. In an embodiment, one or more bolts may be configured to mate the first section 31a to the second section 31b (and any spacers 36 therebetween the sections 31a, 31b) such that each cylinder of section 31a and its respective piston (not shown for clarity) are inwardly, opposedly aligned with one of the cylinders from section 31b and its respective piston. The bolts may be configured to have a length that accommodates the overall size of the two sections 31a, 31b to meet a range of desired engine configurations.

When mated or connected together a cylinder from section 31a that is aligned with a cylinder from section 31b form one combined cylinder.

In an embodiment, the housing of the OPE 30 and/or its sections 31a, 31b may be formed from steel, aluminum, or any other suitable material or materials.

FIGS. 8A and 8B also depict a plurality of air intake passageways or inlets 35a and a plurality of air exhaust passageways or outlets 35b, where each combined cylinder may have at least two or more intake inlets 35a and at least two or more exhaust outlets 35b.

Continuing, in an embodiment an intake valve (not shown) may be positioned within each intake inlet 35a, and an exhaust valve (not shown) may be positioned within each exhaust outlet 35b. It should be noted that the configuration of the intake and exhaust inlets/outlets 35a,35b in FIGS. 8A, 8B is only one example of how air and other gases may be inserted into, and exhausted from, the OPE 30. For example, in alternative embodiments, each cylinder may have (i) a single intake inlet and two exhaust outlets, or (ii) a single intake inlet and a single exhaust outlet, or (iii) three intake inlets and a single exhaust outlet.

Regarding intake and exhaust valves, in each of the OPEs discussed herein a desired number of intake and exhaust valves may be provided, having a desired shape and/or axial orientation with respect to each other and a desired spatial arrangement to meet the requirements of a particular engine configuration, depending on such factors as the geometry of the end-use envelope in which the OPE is to be installed, and/or the air and exhaust volumetric flow rate requirements for the desired combustion reaction or cycle. Still further, the characteristics/shape/form of structures (e.g., the cylinder) surrounding the valves may be specified in order to enable the use of valves of a certain type or to enable the mounting of the valves at desired locations along a cylinder to control intake and exhaust flow, and other pertinent factors. That is to say, the number, size, shape and locations of the valves may be varied and specified to meet the requirements of a particular biogas fueled, OPE design (i.e., geometry and/or operation of a biogas fueled OPE, for example). By way of a non-limiting example, the OPEs described herein may include two intake valves and two exhaust valves per cylinder positioned on an OPE configured in an "L" head configuration, where an exemplary OPE may include a plurality of cylinders.

Yet further, the specific method of actuating an intake or exhaust valve may be configured to meet the fluid dynamics and characteristics of a given fuel utilized by an OPE.

Continuing, and with reference to FIG. 8B, there are shown rotatable crankshaft gears 32a, 32b, rotatable camshaft gears 33a, 33b and rotatable synchronization gears 34a to 34n. In an embodiment, each section 31a, 31b may comprise at least one corresponding rotatable crankshaft gear 32a, 32b and at least one rotatable camshaft gear 33a, 33b, where each crankshaft gear 32a, 32b is connected to a respective rotatable crankshaft (not shown) that rotates and moves as a result of the movement of pistons in cylinders during the cycles of the engine 30. Further, because each crankshaft gear 32a, 32b is rotatably connected to a camshaft gear 33a, 33b, the rotation of each crankshaft gear 32a, 32b causes the rotation of each, rotatably connected camshaft gear 33a, 33b. In an embodiment, each camshaft gear 33a, 33b may be connected to a camshaft (not shown). In an embodiment, the rotation of the camshaft gears 33a, 33b causes the connected camshaft to rotate and open or close one or more intake and/or exhaust valves (not shown) to allow air and other gases into, and out of, each combined cylinder's combustion or compression chambers.

In an embodiment, to insure that the intake and exhaust valves are appropriately synchronized engine 30 may also include one or more synchronization gears 34a to 34n, where (i) one of the gears 34a to 34n may be rotatably connected to the crankshaft gear 32a, (ii) another of the gears 34a to 34n may be rotatably connected to the crankshaft gear 32b, and (iii) one or more of the gears 34a to 34n may transmit the rotational energy from crankshaft gear 32a to crankshaft gear 32b (or vice versa), which in turn causes a camshaft gear, such as gear 33b, to rotate. Accordingly, due to the transmission of the rotational energy from one crankshaft gear 32a to another 32b via the synchronizing gears 34a to 34n, as each crankshaft gear 32a, 32b rotates their rotatably connected camshaft gears 33a, 33b rotate in a synchronized and connected fashion as determined by the OPE's 30 operating parameters and characteristics.

Figure 9A:
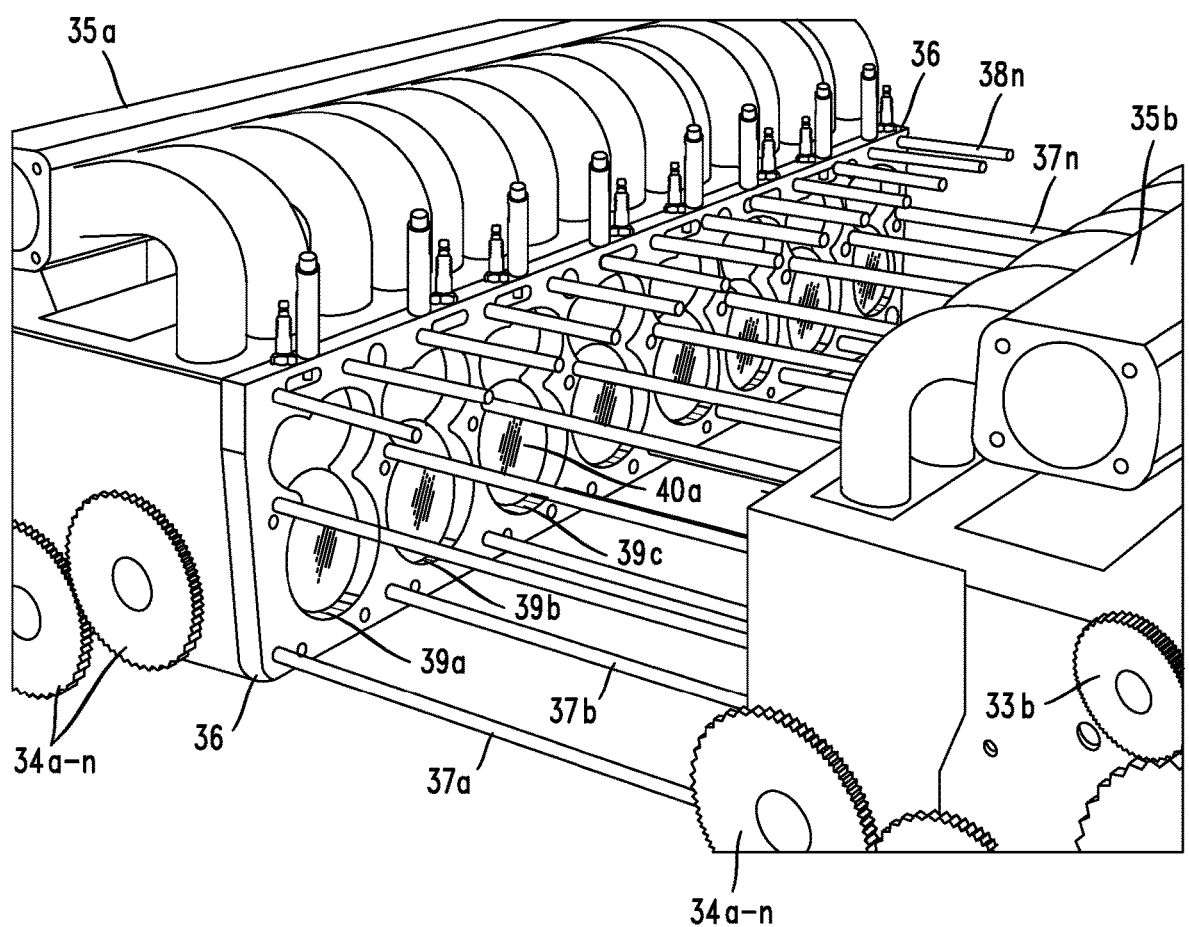
FIGS. 9A and 9B illustrate one or more spar bolts that may be incorporated into an exemplary engine of the present disclosure.
Figure 9B:
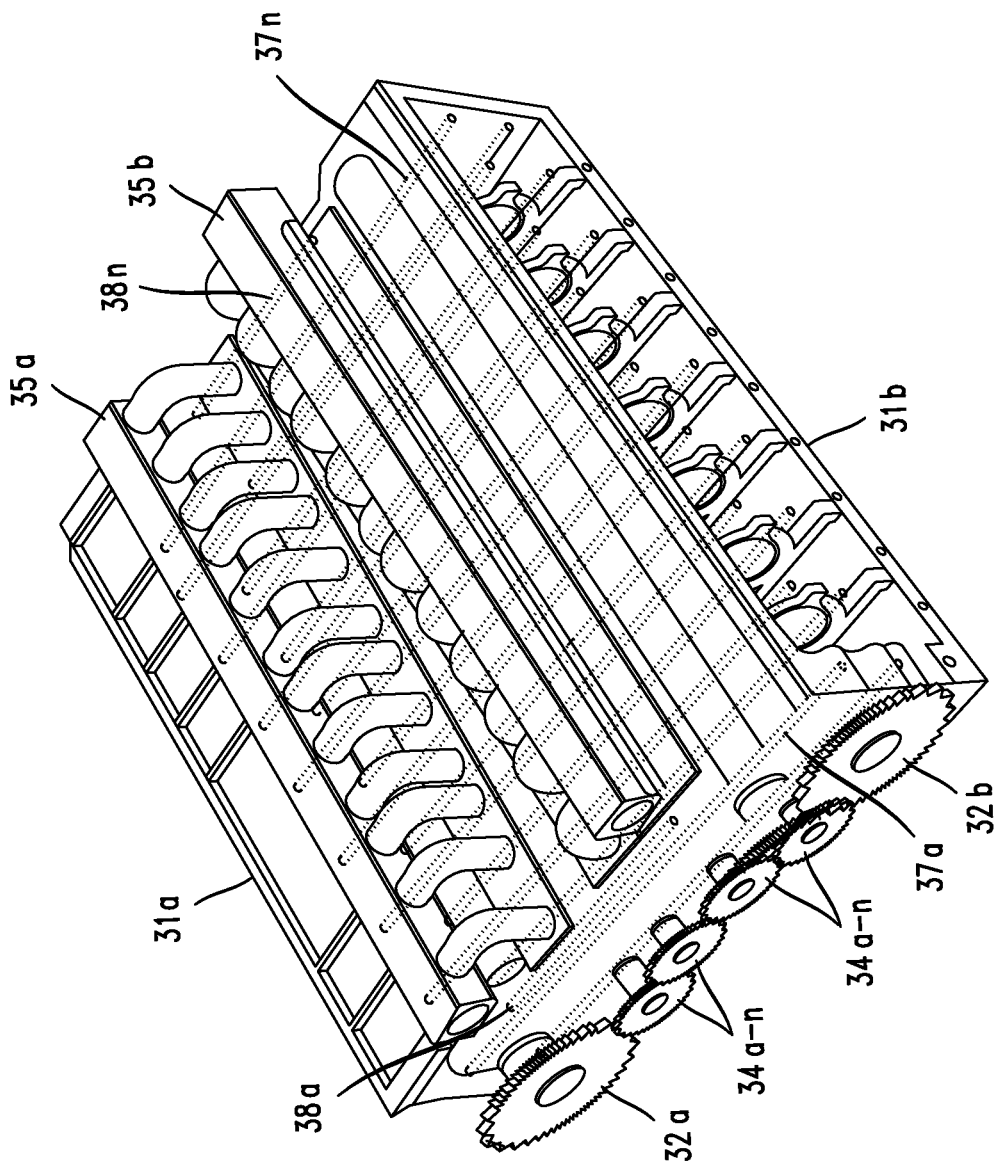
Figure 10:
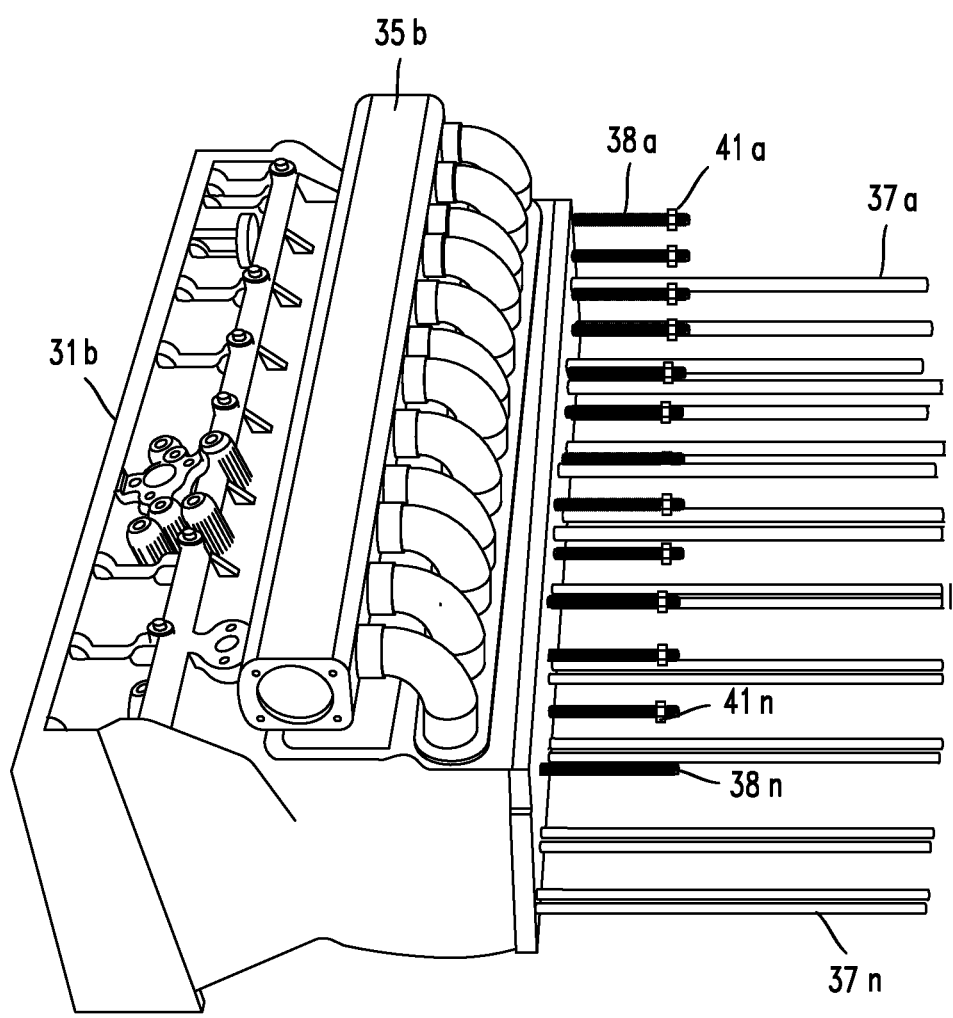
FIG. 10 also depicts one or more spar bolts that may be incorporated into an exemplary engine of the present disclosure.

Referring now to FIGS. 9A and 9B there are illustrated one or more first bolts 37a to 37n (e.g., spar bolts) and second bolts 38a to 38n (e.g., spar bolts; where "a" indicates the first spar bolt and "n" indicates the last spar bolt) according to an embodiment of the present disclosure. Similar to the explanation above, first bolts 37a to 37n and second bolts 38a to 38n may be used to connect the two sections 31a, 31b of the OPE 30.

In FIGS. 9A and 9B the first bolts 37a to 37n have a different length than the second bolts 38a to 38n because the first bolts 37a to 37n are configured to extend from one crankshaft to another crankshaft of the OPE 30 while the second bolts 38a to 38n may be positioned closer to the intake and exhaust valves, and, thus, cannot traverse through such valves without interrupting the valves proper operation. In one embodiment, the length of first bolts 37a to 37n may be a particular length required to reach from one end-cap of the OPE 30 to another end-cap while the length of second bolts 38a to 38n may be determined based on the particular valve design of a particular OPE, it being understood that these lengths are merely exemplary and that other lengths may be used based on the particular design of an engine. In more detail, each first bolts 37a to 37n and second bolts 38a to 38n may have a length that is determined by the dimensions of the two sections 31a, 31b and the positioning and design of the intake and exhaust valve assemblies (e.g., the width, length or depth) plus the dimensions of any engine caps (not shown) and spacers, such as spacer 36. Each first bolt 37a to 37n and second bolt 38a to 38n may be secured to a respective engine block or section 31a, 31b and engine cap using connectors, e.g., nuts on both opposite ends, for example (not shown in FIG. 9A or 9B, but see FIG. 10, elements 41a to 41n on second bolts 38a to 38n in section 31b).

First bolts 37a to 37n and second bolts 38a to 38n may be configured to longitudinally pass through openings in each of the sections 31a, 31b as well as through openings in each spacer 36 (openings shown, but not labeled for ease of viewing in FIGS. 9A and 9B but see elements 44a to 44n and 45a to 45n in FIG. 12) in order to connect the two engine sections or blocks 31a, 31b together.

In an embodiment, a single first bolt 37a to 37n and second bolt 38a to 38n may be composed of an engineered steel. In effect, the incorporation of such first bolts 37a to 37n and second bolts 38a to 38n (e.g., spar bolts) into an OPE effectively may make the bolts 37a to 37n and 38a to 38n the superstructure of an inventive OPE. Further, the incorporation of such bolts 37a to 37n and 38a to 38n may allow a number of cylinders to be cast.

In embodiments, the inventive bolts 37a to 37n and 38a to 38n may replace the need to have head studs holding the two sections 31a, 31b together. Further, to incorporate the first bolts 37a to 37n, end caps of crankshafts (not shown, but see elements 19a, 19b in FIG. 6) may be slightly machined in order for example, to accommodate a higher degree of torque similar to what is commonly employed on conventional cylinder heads (e.g., around ~90 lb. ft. of torque).

Figure 11:
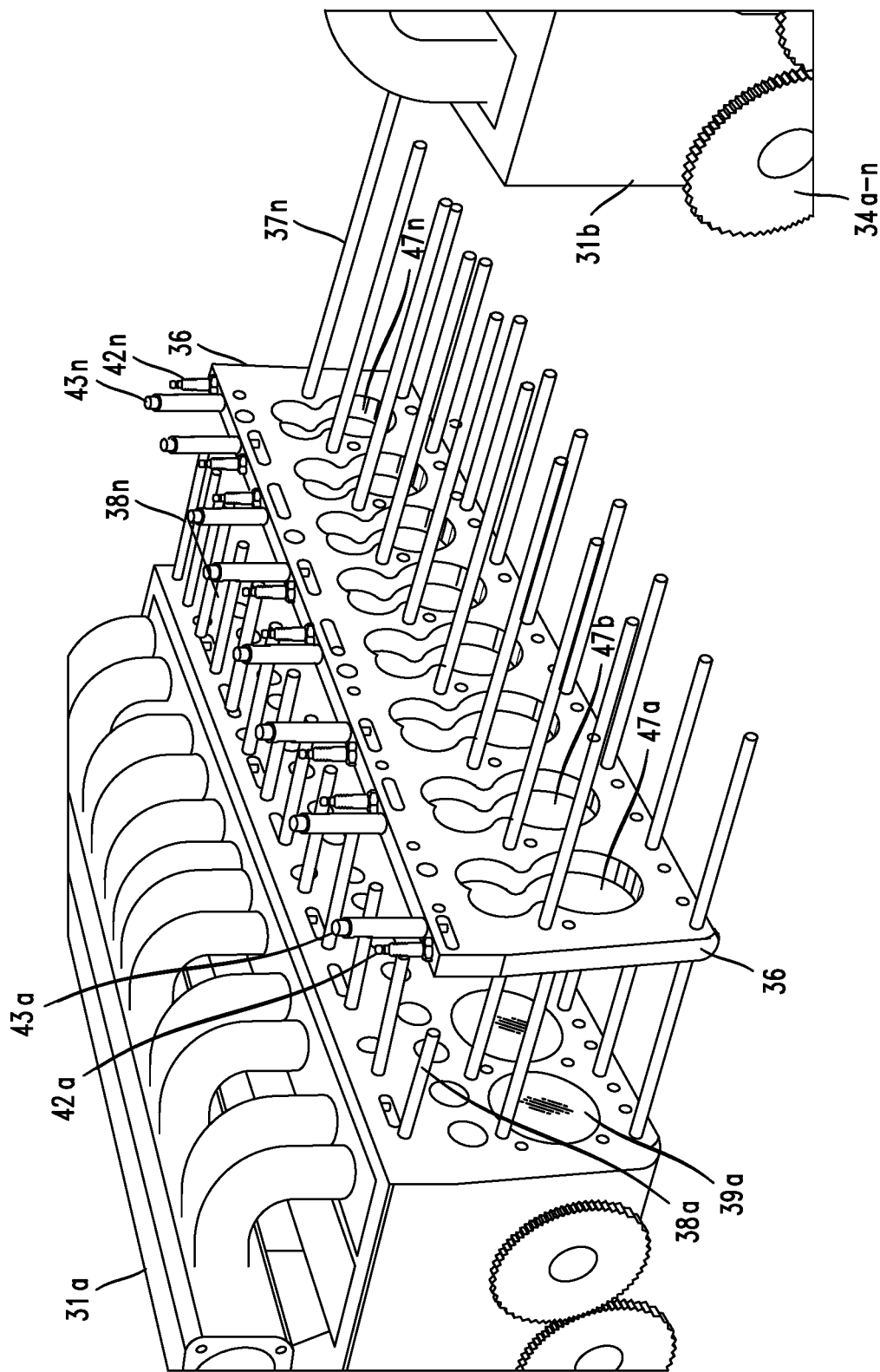
FIG. 11 depicts an "exploded" view of a spacer that may be incorporated into an exemplary engine of the present disclosure.

FIG. 11 depicts an "exploded" view of a spacer 36 that may be incorporated into the exemplary engine 30 of the present disclosure. In an embodiment, the width of the spacer 36 may be selected based on, for example, a desired compression ratio for OPE 30 and its geometry. That is to say, one of the functions of the spacer 36 is to control the volume of the combustion chamber, which in turn may control or affect the compression ratio of the OPE 30.

As mentioned previously, and as shown in FIG. 11, first bolts 37a to 37n and second bolts 38a to 38n may have different lengths (e.g., first bolts 37a to 37n may be typically longer than second bolts 38a to 38n) and pass through the spacer 36 in order to join the two sections 31a, 31b together. FIG. 11 also depicts the positioning of one or more openings 39a to 39n in section 31a, each of which form part of a cylinder within which an inwardly opposed piston (or set of inwardly opposed pistons) may travel as well as one or more spark plugs 42a to 42n and fuel injectors 43a to 43n. Though similar openings in section 31b are not depicted in FIG. 11, it should be understood that corresponding openings in section 31b are included. In an embodiment, each of the individual openings 39a to 39n in section 31a and each of the corresponding, individual openings in section 31b form a combined cylinder when the two sections 31a, 31b are joined together within which a pair of inwardly opposed pistons (not shown) travel back and forth.

As shown, in one embodiment each of the spark plugs 42a to 42n and each of the fuel injectors 43a to 43n may be positioned on and through one side of the spacer 36 such that one end of each of the spark plugs 42a to 42n (i.e., the ignition or end that generates an electrical spark) and one end of each fuel injector 43a to 43n (i.e., an end that allows fuel to flow out) protrudes into an opening 47a to 47n in spacer 36. In an embodiment, the openings 47a to 47n may represent (i) a combination of a combustion pre-chamber and combustion chamber, or (ii) a combustion chamber or (iii) a compression chamber, for example. Further, the end of each fuel injector 43a to 43n that protrudes into an opening 47a to 47n may comprise a spray nozzle to spray a fuel into a combustion or compression chamber, where the length of the nozzle should be minimized to minimize the trapping of fuel.

The spark plugs 42a to 42n may be short or long-reach spark plugs or a glow plug (i.e., for compression ignition) and may be operable to ignite one or more different fuels such as hydrogen, propane or another gaseous fuel for example. Similarly, the fuel injectors 43a to 43n may be direct fuel injectors to ignite at least one or more different gaseous fuels such as hydrogen or propane for example.

Figure 12:
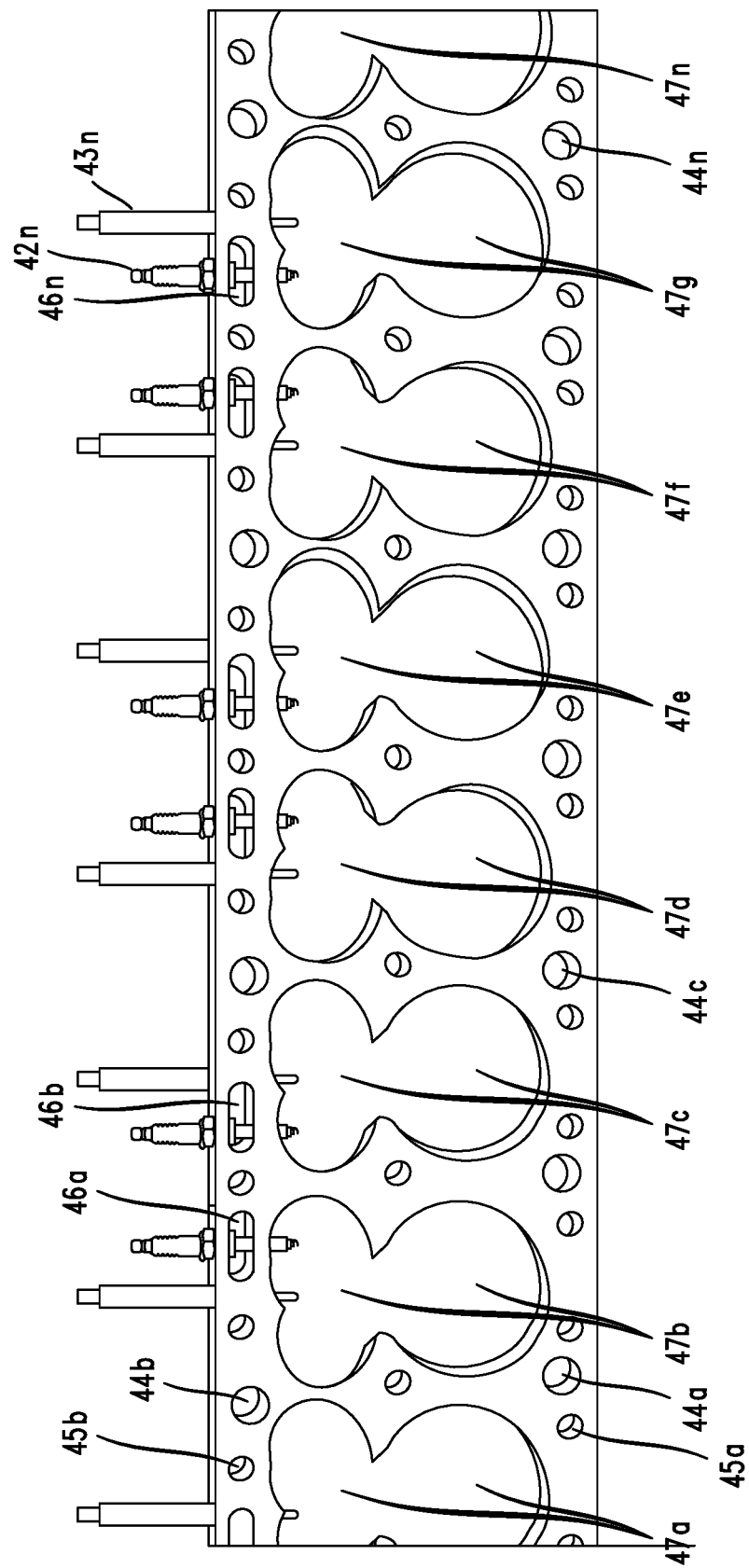
FIG. 12 depicts a view of an exemplary spacer that may be incorporated into an exemplary engine of the present disclosure.

FIG. 12 depicts a simplified diagram of the openings 44a to 44n and 45a to 45n (only some are labeled for clarity) that may be made in spacer 36 as well as in engine blocks or sections 31a 31b. In embodiments, the dimensions of the openings 44a to 44n may be configured to receive the one or more first bolts 37a to 37n (i.e., the longer spar bolts) while the dimensions of the openings 45a to 45n may be configured to receive the one or more second bolts and 38a to 38n (the shorter spar bolts), for example.

Figure 13:
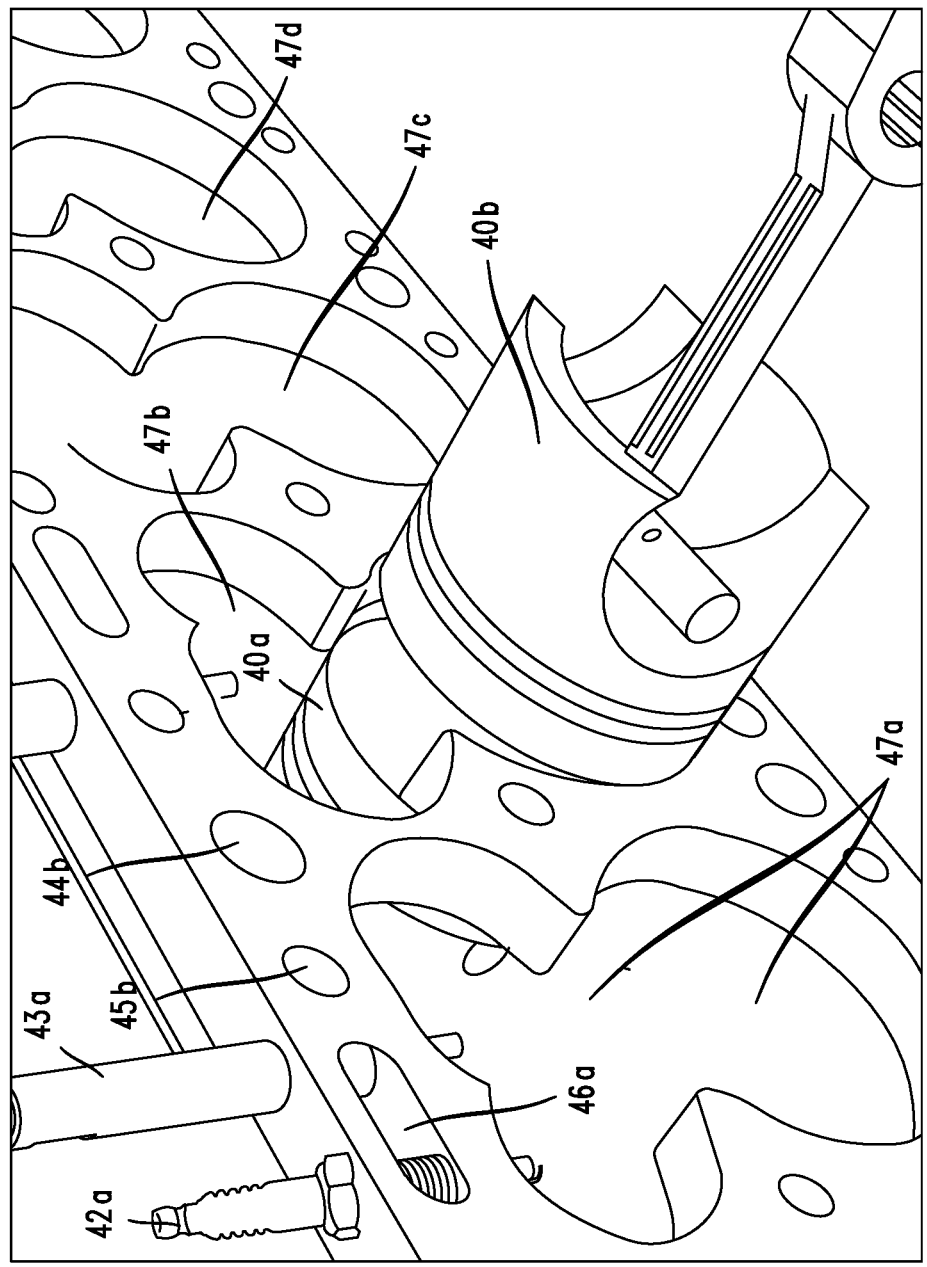
FIG. 13 depicts a simplified illustration of inwardly opposed pistons of an exemplary engine of the present disclosure in relation to an exemplary spacer that may be incorporated into the exemplary engine.

FIG. 12 also depicts one or more coolant openings 46a to 46n in the spacer 36. In an embodiment, a coolant may be channeled into each combustion or compression chamber by a spray or tubing, each chamber formed by the volume comprising at least the volume of openings 47a to 47n in the spacer 36 as well as the volume of a combined cylinder (see openings 39a to 39n in FIG. 11 that indicate the position of one half of a combined cylinder, i.e., the openings 39a to 39n lead into one half of a combined cylinder that encloses an inwardly opposed piston). For example, FIG. 13 depicts a simplified illustration of opposed pistons 40a, 40b of the exemplary engine 30 as the pistons 40a, 40b pass through a portion of the volume of opening 47b in exemplary spacer 36. As shown the opposed pistons 40a, 40b have moved inwards within their respective cylinders (not shown) towards one another, thereby compressing the volume of air or other gases within the chamber formed by their cylinders and the spacer 36.

Figure 14:
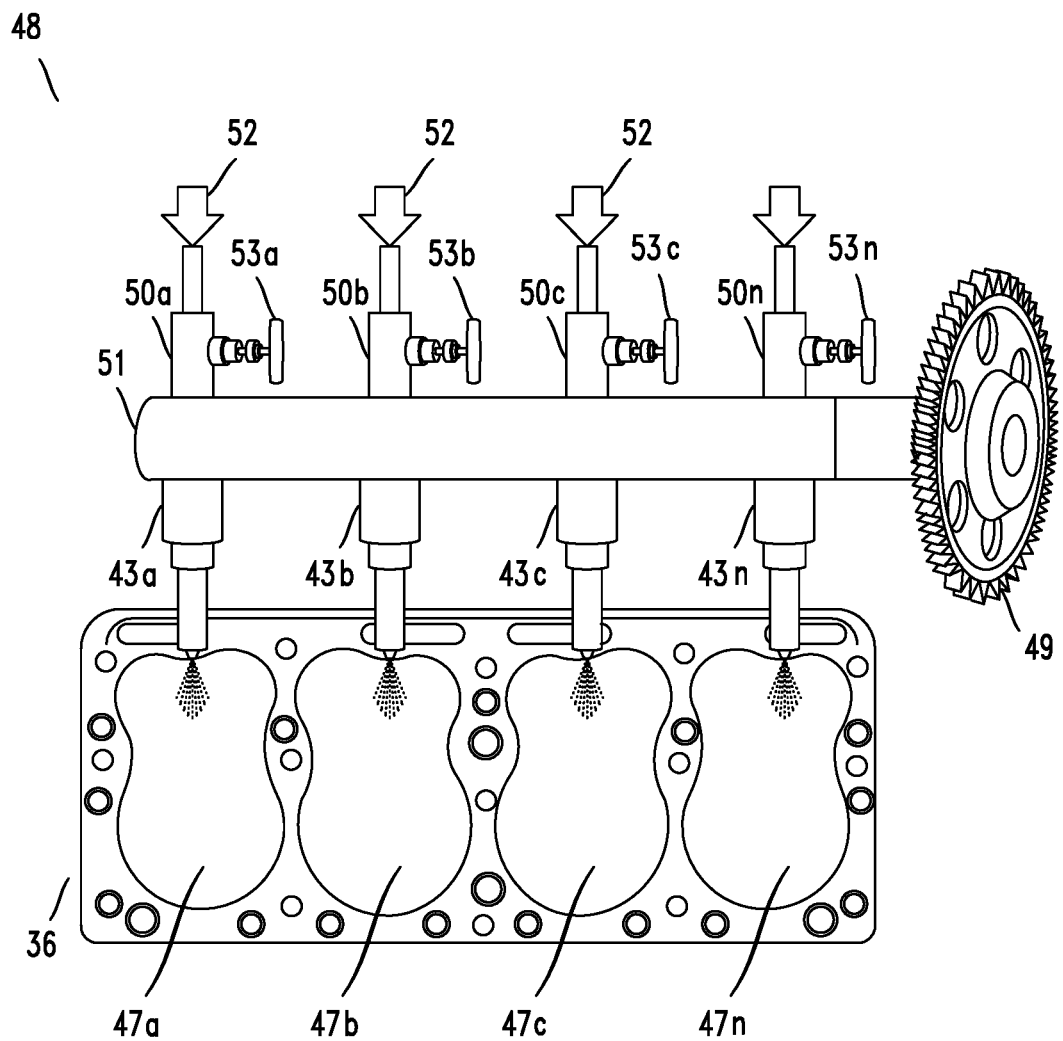
FIG. 14 depicts an exemplary fuel injector control system according to one embodiment of the disclosure.

Referring now to FIG. 14 there is depicted an exemplary fuel injector control system 48. Recall that previous figures have depicted one or more direct fuel injectors 43a to 43n. In an embodiment, the injector control system 48 is configured to control the flow of a fuel 52, such as a gaseous or liquid hydrogen or biogas to name non-limiting examples of a fuel, into each of the direct fuel injectors 43a to 43n, thereby controlling the flow and volume of fuel into a combustion of compression chamber represented in FIG. 14 by openings 47a to 47n of spacer 36.

In an embodiment, the fuel injection control system 48 may comprise one or more rotatable gears 49, one or more direct injector, fuel control valves 50a to 50n, where each direct injector, fuel control valve 50a to 50n may be configured to feed a fuel 52, such as hydrogen or a biogas, to a tubular control valve 51 and then, as desired under the control of connected gear 49 and valves 50a to 50n, to one of the direct fuel injectors 43a to 43n and eventually to one of the chambers represented by openings 47a to 47n of the spacer 36 where the fuel may be compressed or combusted by the movement of opposed pistons and/or ignition devices (e.g., spark plugs, glow plugs).

Figure 15A:
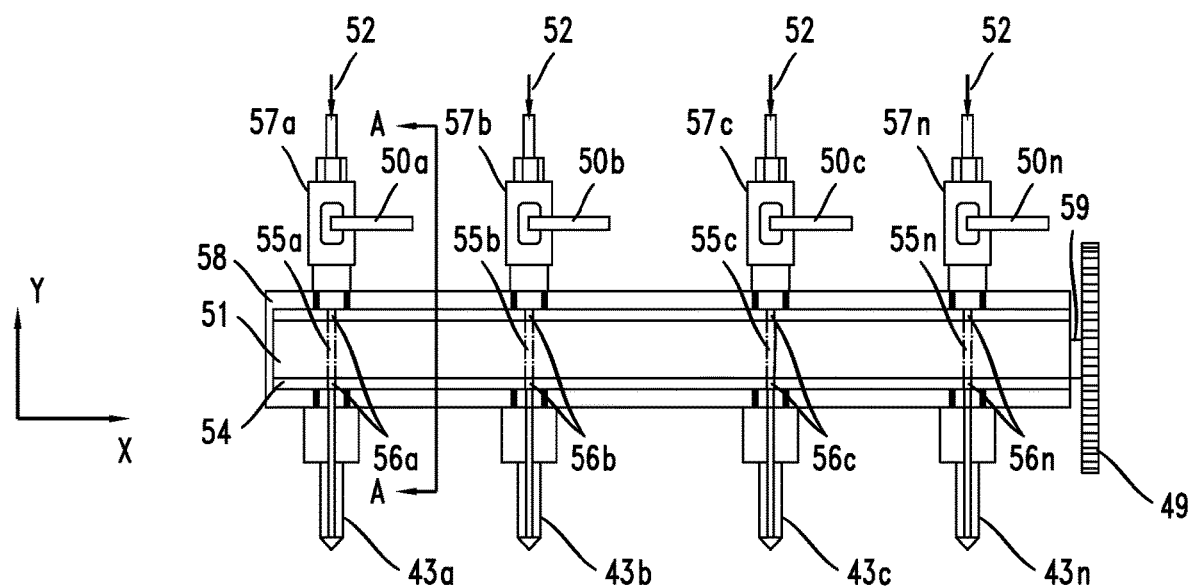
FIGS. 15A and 15B depict an exemplary fuel control system according to embodiments of the disclosure.
Figure 15B:
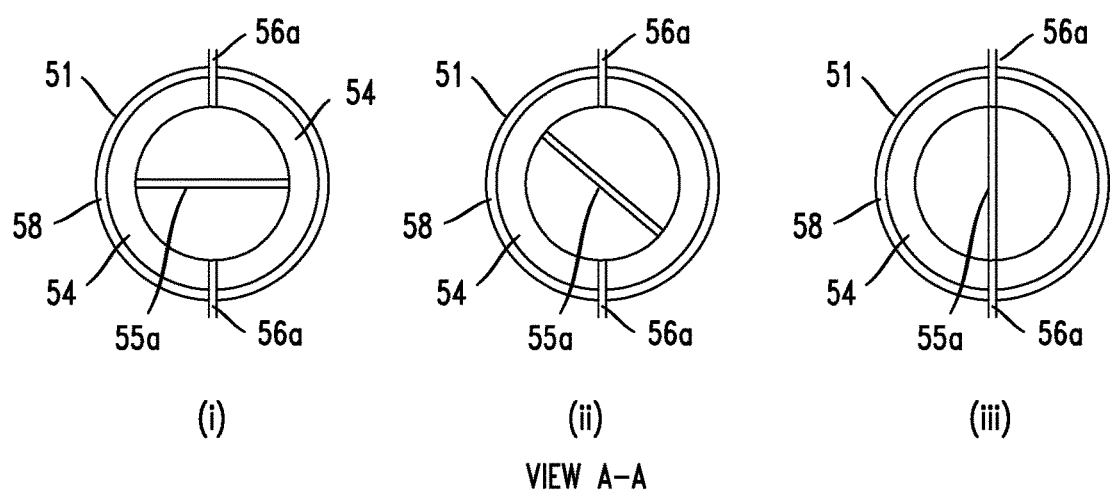

In an embodiment, the tubular control valve 51 may comprise a stationary outer tube 58 and a solid rotating inner tube 54 as shown in FIGS. 15A and 15B.

It should be understood that the one or more gears 49 (collectively referred to as "gear" for short) may be connected to a crankshaft and may rotate at a speed that approximates ¼ of the rotational speed of the crankshaft to control the flow of the fuel 52 to the engine 30. The gear 49 may be connected to the rotatable inner tube 54 via mechanical connections 59. Thus, as the gear 49 rotates, so too does the inner tube 54 rotate.

In more detail, the rotating inner tube 54 may be configured to comprise one or more inner slits, passageways or channels 55a to 55n (collectively "channels") configured through the full diameter of the tube 54 (e.g., along the y-axis in FIG. 15A) and at positions along its lengthwise axis (e.g., the x-axis in FIG. 15A), where each of the channels 55a to 55n is positioned along the inner tube 54 at locations that rotatably align with a pair of fixed openings designated 56a to 56n at the top and bottom of the stationary outer tube 58 as the inner tube 54 is rotated by the at least one gear 49.

In an embodiment, each channel 55a to 55n may align with a pair of openings 56a to 56n such that when a channel 55a to 55n rotatably aligns with its corresponding pair of openings 56a to 56n, a fuel 52 is permitted to flow through injector bodies 57a to 57n through the aligned openings 56a to 56n and passageways 55a to 55n and into the direct fuel injectors 43a to 43n. In sum, the fuel control system 48 may permit or block the flow of fuel 52 in a controlled manner.

In an embodiment, the dimensions of the channels 55a to 55n and the dimensions of the openings 56a to 56n may be predetermined and selected based on the type of fuel being utilized. In an embodiment, when hydrogen is used as the fuel, the dimensions of each of the channels 55a to 55n and the dimensions of the openings 56a to 56n may be determined based at least on the measured or expected pressure of the hydrogen and the size of the engine, for example. In embodiments, the larger the engine or larger the pressure, the larger the dimensions of a channel and of an opening.

Backtracking somewhat, the above process or method may occur as stated. However, in an alternative embodiment, when the engine 30 is shut off, but the channels 55a to 55n are coincidentally aligned with openings 56a to 56n, the present inventors provide an additional way to prohibit fuel 52 from flowing to the direct injectors 43a to 43n.

In an embodiment, the fuel 52 may be prohibited from flowing to the direct injectors 43a to 43n if one or more control switches 50a to 50n are closed. In an embodiment, each of the control switches 50a to 50n may be configured with electronic components that are operable to receive an electrical signal from a sensor (not shown) in the engine 30 which indicates that the engine 30 is no longer operating. In response to reception of such a signal, the one or more control switches 50a to 50n may close to prohibit the flow of fuel 52 to the openings 56a to 56n, channels 55a to 55n, fuel injectors 43a to 43n, cylinders and pistons until such time as electronic components of the control switches 50a to 50n receive an electrical signal from the sensor (not shown) indicating that the engine 30 is now operating (e.g., the engine 30 is turned on again). Accordingly, the inventors believe that prohibiting the flow of fuel, such as hydrogen, while an engine is not operating prevents degradation of components of the engine because the continued presence of hydrogen in contact with engine components while an engine is not operating may cause some of the components to become brittle and degrade their intended function.

Referring now to FIG. 15B there is depicted simplified views of the control system 48 taken along view A-A in FIG. 15A. In FIG. 15B only one channel 55a of inner tube 54 and only one set of openings 56a at the top and bottom of outer tube 58 are shown in the three separate views (i) to (iii) as the inner tube 54 rotates for ease of understanding, it being understood that each channel 55a to 55n and its corresponding set of openings 56a to 56n may operate in a similar fashion.

In view (i), at some point in time during rotation of the inner tube 54 the channel 55a is not aligned with openings 56a at the top and bottom of outer tube 58. Thus, fuel 52 is not permitted to flow through to a corresponding fuel injector. In view (ii), the inner tube 54 continues to rotate clockwise, for example, but is still not aligned with the openings 56a and, thus fuel 52 does not flow through the channel 55a. In view (iii) the inner tube 54 has rotated to a position where the channel 55a is now aligned with the openings 56a and, thus fuel 52 is permitted to flow through the channel 55a and on to a corresponding fuel injector 43a provided, of course, that corresponding control switch 50a is in an open state.

Benefits, advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

We claim:

1. An opposed piston engine (OPE) comprising:
   a first and a second engine block, the first engine block comprising one or more first cylinders and the second engine block comprising one or more second cylinders, where each first cylinder may comprise a first piston and each second cylinder may comprise a second piston; and
   one or more bolts configured to mate the first engine block to the second engine block such that each first cylinder and its respective piston is inwardly, opposedly aligned with one of the second cylinders and its respective piston; and
   one or more spacers between the first and second engine blocks, each spacer comprising a silicon carbide.

2. The OPE as in claim 1 wherein each bolt comprises a spar bolt.

3. The OPE as in claim 1 wherein each of the one or more bolts are configured to longitudinally pass through openings in the first engine block and the second engine block and through openings in each of the one or more spacers.

4. An opposed piston engine (OPE) comprising:
   a first and a second engine block, the first engine block comprising one or more first cylinders and the second engine block comprising one or more second cylinders, where each first cylinder may comprise a first piston and each second cylinder may comprise a second piston;
   one or more bolts configured to mate the first engine block to the second engine block such that each first cylinder and its respective piston is inwardly, opposedly aligned with one of the second cylinders and its respective piston; and
   one or more aluminum spacers configured between the first and second engine blocks, each spacer comprising one or more openings or perforations to allow the one or more bolts to pass through unimpeded,
   wherein the one or more bolts pass through approximately an entire length comprising the first engine block, the one or more aluminum spacers, and the second engine block.

5. The OPE as in claim 4 wherein each of the one or more bolts are configured to longitudinally pass through openings in the first engine block and the second engine block and through the one or more openings or perforations in each of the one or more spacers.

* * * * *